United States Patent [19]

Keefer

[11] Patent Number: 4,973,408

[45] Date of Patent: Nov. 27, 1990

[54] REVERSE OSMOSIS WITH FREE ROTOR BOOSTER PUMP

[76] Inventor: Bowie G. Keefer, 4324 West 11th Ave., Vancouver, British Columbia, Canada, V6R 2M1

[21] Appl. No.: 314,192

[22] Filed: Feb. 23, 1989

Related U.S. Application Data

[63] Continuation-in-part of Ser. No. 37,796, Apr. 13, 1987, abandoned, which is a continuation-in-part of Ser. No. 45,285, Jun. 4, 1979, abandoned.

[51] Int. Cl.$^5$ .............................................. B01D 61/06
[52] U.S. Cl. .................................... 210/652; 210/137; 210/321.66; 210/416.1
[58] Field of Search ................ 210/416.1, 652, 321.66, 210/137; 241/46.17; 417/245; 366/296

[56] References Cited

U.S. PATENT DOCUMENTS

| | | | |
|---|---|---|---|
| 3,369,667 | 2/1968 | Clark et al. ................ | 210/321.66 X |
| 3,654,148 | 4/1972 | Bradley ....................... | 210/321.66 X |
| 4,230,564 | 10/1980 | Keefer ......................... | 210/652 |
| 4,321,137 | 3/1982 | Kohler ......................... | 210/137 |

Primary Examiner—Frank Spear

[57] ABSTRACT

Apparatus and process for reverse osmosis or other pressure-driven membrane fluid separations, with a free rotor booster pump to increase the pressure of a feed fluid from an initial feed pressure to a working pressure at which perm-selective membranes separate the feed fluid into permeate and concentrate fluid fractions. The free rotor booster pump is powered solely by expansion of the concentrate fluid, thus recovering pressure energy from the concentrate fluid to amplify the pressure of the feed fluid. The free rotor booster pump is self-starting, provides desirable self-regulating characteristics to the apparatus, and simplifies the process since auxiliary valves that were required with prior art energy recovery turbines for starting procedures and running adjustments may be eliminated.

25 Claims, 11 Drawing Sheets

REVERSE OSMOSIS WITH FREE ROTOR BOOSTER PUMP

CROSS REFERENCE TO PREVIOUS APPLICATIONS

This is a continuation-in-part of my copending application Ser. No. 07/037,796 filed 13 Apr. 1987 and entitled REVERSE OSMOSIS APPARATUS AND METHOD USING HYDRAULIC BOOST, now abandoned, which itself is a continuation-in-part of my abandoned application Ser. No. 06/045,285 filed 4 Jun. 1979 and entitled APPARATUS AND METHOD FOR REVERSE OSMOSIS OR ULTRAFILTRATION WITH HYDRAULIC BOOSTER PUMP.

TECHNICAL FIELD

This invention applies to pressure-driven membrane fluid separation processes, including reverse osmosis and ultrafiltration.

BACKGROUND ART

While the following exposition of the invention will refer mainly to the important application of water desalination and purification by reverse osmosis, it will be understood that the invention encompasses application of the same principles to any other fluid separation process in which applied pressure is used to drive one component of a fluid mixture across selectively permeable membranes.

Fluid separation by a pressure-driven membrane process is achieved by pumping the feed stream (in reverse osmosis, typically saline water) to a suitably elevated working pressure, and conveying the pressurized feed stream into a pressure vessel containing a suitable array of semi-permeable membranes. The feed stream is circulated through feed channels on the high pressure side of the membranes, with a suitable flow velocity to alleviate adverse boundary layer effects by forced convection. A permeate fraction (in reverse osmosis, product water of greatly reduced salinity) will permeate across the membranes into low pressure collection channels if the working pressure sufficiently exceeds the feed stream osmotic pressure, with a considerable excess pressure required to achieve high flux and purity of the permeate.

While the purified permeate fraction of the feed is withdrawn from the low pressure collection channels of the membranes, the feed stream becomes concentrated along the feed channels, and a rejected concentrate fraction must be withdrawn from the high pressure side of the membranes in order to prevent excessive salt concentrations over the membranes. The concentrate stream may be a large fraction of the feed stream; and in the case of sea water reverse osmosis desalination the concentrate stream is typically 70% to 80% of the feed stream. The concentrate stream is removed from the membranes at nearly the full working pressure, and thus carries a large fraction of the pressure energy that was imparted to the feed stream.

It must be emphasized that the working conditions of the membranes in a given installation must be maintained within certain design limits for satisfactory performance and life. Thus, the working pressure, feed channel flow velocity, concentrate flow, and feed/concentrate ratio must each be maintained between upper and lower limits. Accordingly, the external hydraulic devices supplying the feed stream and removing the concentrate stream must be correctly matched to the membranes under all conditions.

However, actual working conditions are sensitive to the feed conditions (salinity and temperature) which may be widely variable as in the case of shipboard desalination systems; and to the condition of the membranes (fouling and flux decline) which will certainly be variable over the life of the installation. Since the working conditions are always drifting at least somewhat unpredictably because of membrane of feed changes, the hydraulic devices on feed and concentrate streams must adapt to restore correct hydraulic matching to the membranes. In prior art reverse osmosis systems, these hydraulic devices have been unable to provide fully self-regulating adaptation under a full range of changing conditions without operator intervention, while also approaching highest energy efficiency.

Before the concentrate stream is exhausted, it must be depressurized by an appropriate hydraulic device. In most prior art reverse osmosis installations, the concentrate stream is depressurized by throttling over a back-pressure valve, with the characteristics of either an adjustable orifice or relief valve. The back-pressure valve provides means to regulate the membrane working pressure by suitable adjustment, but dissipates all of the pressure energy carried by the concentrate stream. Such reverse osmosis installations are highly inefficient, may have difficulties with erosion or plugging of the orifice, and often require operator intervention to adjust the back-pressure valve for proper matching to feed flow and membrane operating conditions.

In some prior art reverse osmosis systems, the concentrate stream is depressurized by expansion through an energy recovery device. Reciprocating energy recovery pumps have been found to be practicable for relatively small reverse osmosis systems. A class of reciprocating energy recovery pump operates with a strictly constant ratio between feed and concentrate streams, determined by the fixed ratio of displacements between pumping and expansion chambers. With a fixed feed/concentrate ratio, permeate flow is directly proportional to pump speed, and working pressure is determined entirely by membrane resistance to the imposed permeate flow. Such energy recovery pumps may be operated at variable speed to provide favourable matching with solar or other unsteady power sources as discussed by Keefer et al (B. G. Keefer, R. D. Hembree and F. C. Schrack, "Optimized Matching of Solar Photovoltaic Power with Reverse Osmosis Desalination", Desalination 54, 89–103, (1985)). However, a fixed feed/concentrate ratio can be disadvantageous when the pump is operated at constant speed, and feed water conditions (salinity, temperature) vary widely. Thus in shipboard installations with constant permeate flow, working pressure will vary too widely with the normal variation of sea water salinity and temperature between arctic and equatorial oceans. A selfregulating characteristic with a declining ratio of permeate to feed flow at higher pressure would be preferable, so that working pressure would vary less widely with changing membrane flux.

It is also well known in the prior art to use a hydraulic turbine for energy recovery from the concentrate stream. Both impulse turbines such as Pelton turbines, and reaction turbines such as radial turbines or reverse-running centrifugal pumps, have been used in reverse osmosis systems, with the turbine usually coupled as an auxiliary power source to the high pressure pump pressurizing the feed stream to the working pressure. Application and control of Pelton turbines is discussed by Woodcock et al (D. J. Woodcock and I. M. White, Desalination 39, 447 (1981)). Use of reverse-running centrifugal pumps as energy recovery turbines for reverse osmosis is discussed by Raja et al (W. A. Raja and R. W. Piazza, Desalination 38, 123, (1981)).

When the feed pump is a centrifugal pump, the energy recovery turbine may conveniently operate at the same shaft speed and may be coupled directly to the feed pump. According to the selection of prime mover, the pump shaft speed is usually substantially constant. Because of variations in the feed conditions and permeability of the membranes, turbine entry pressure and flow of the concentrate stream will vary. Thus, an adjustable nozzle will be required for a Pelton turbine (as described in the cited reference by Woodcock et al), and will be desirable for a constant shaft speed radial turbine. An adjustable throttle valve is frequently also provided between the feed pump and the membranes, or between the membranes and the energy recovery turbine, to compensate for mismatch of hydraulic conditions between the pump, turbine and membranes. Use of throttle valves to correct hydraulic matching errors is of course wasteful of energy, and complicates system operation and control. Finally, it is common practice to provide a by-pass valve (in parallel with the energy recovery turbine, as described in the cited reference by Raja et al) for the concentrate stream, so that the energy recovery turbine can be hydraulically engaged after the reverse osmosis system has been started. This means that the pump drive motor must be over-sized, and again implies relatively complicated operating and starting procedures. It is seen that prior art use of conventional hydraulic turbines for reverse osmosis energy recovery has entailed a multiplicity of auxiliary control elements, including valves and/or nozzles, for starting and operating adjustments.

Well-known prior art energy recovery pump configurations use a multistage centrifugal pump connected directly to a radial energy recovery turbine, and to a constant speed electric motor prime mover. As noted above, such configurations have required auxiliary valves and relatively complicated operating procedures, to compensate for inevitable maladjustments between the membrane operating conditions and the optimum hydraulic operating points of pump and turbine. Because the head/flow characteristics or centrifugal pumps and radial turbines operating at constant shaft speed have moderate slopes near their optimum operating points, a small drift in membrane operating conditions would cause a relatively large change in permeate flow and large departures from optimal pump and turbine hydraulic conditions, unless a throttle valve is provided as a means of adjusting pressure at a given flow. The throttle valve is thus normally provided as a manual means of adjustment to maintain membrane productivity against flux decline, while also keeping pump and turbine conditions approximately constant. Changes in membrane operating conditions may alternatively be compensated by using a variable speed drive for the pump-turbine combination, as proposed by Fechner et al. (G. Fechner and R. Pillkahn, Desalination 55, 461, (1985)). In applications where electric motors are the prime movers, a variable speed drive will entail substantial additional cost and some efficiency losses.

A related prior art invention by Kohler (U.S. Pat. No. 4,321,137) shows the stages of the feed pump separated into first and second pumps in series. The energy recovery turbine is coupled directly to the first (lower pressure) feed pump, although Kohler points out that it may be coupled to either pump. Both pumps are driven through clutches by electric motors. Once the system has been started and the turbine has been hydraulically engaged, the motor connected to the first pump is disengaged because the turbine drives this pump. In keeping with conventional practice as discussed above, Kohler provides a throttle valve to provide pressure adjustments between the feed pumps and the membranes, and a bypass valve in parallel with the energy recovery turbine. Kohler also provides a controllable speed motor for the second pump, as a further means of optimizing hydraulic matching. This invention illustrates that the turbine can be the running power source to a section of the feed pump which can then be disengaged from its starting motor, but does not provide any simplifications of apparatus or operating procedure. A self-regulating reverse osmosis apparatus is not described, as the turbine and first pump are brought up to a pre-determined shaft speed by their starting motor, and other auxiliary control means (throttle valves and a speed control on the second pump) are provided for system regulation.

The present invention provides a free rotor booster pump to accomplish the final pressurization of the feed stream before entering the membrane feed channels. The free rotor booster pump includes a pump and an energy recovery turbine powered by the concentrate stream, with the turbine as the sole power source to the pump. No external motor or other power source is required to drive or start the free rotor booster pump. The free rotor booster pump is self-starting (once a flow of feed fluid has been initiated) and provides by passive adjustment of its own shaft speed a fully self-regulating control to the reverse osmosis apparatus, with the highly desirable characteristic that the ratio of permeate flow to feed flow declines at higher working pressures. No auxiliary throttle valves or bypass valves are required for starting or running regulation, and the only operator control required is to turn the feed stream supply means on or off.

The use of a turbine powered by one fluid streams as the direct and only prime mover to a pump pressurizing a second fluid stream is of course well known in diverse prior art applications other than reverse osmosis. Free rotor centrifugal compressors driven by turbines are well known in twin spool gas turbines and automotive turbochargers. Schwartzman (U.S. Pat. No. 4,067,665) describes a free rotor turbine-driven centrifugal booster pump used as a pressure intensifier, so that a portion of the feed stream at an initial pressure is used to power the turbine and the remainder of the same feed stream is pressurized by the pump to a higher delivery pressure. Likewise, it is well known to use the free rotor combination of a positive displacement rotary pump (such as a vane or gear pump) and a similar positive displacement hydrostatic motor, for diverse applications such as fluid pressure intensifiers and proportioning flow dividers.

While free rotor turbine-driven pumps and compressors have an extensive prior art in other applications, the present invention obtains substantial and unexpected benefits from the use of a free rotor booster pump for final pressurization of the feed fluid to a pressure-driven membrane separation process. In addition to recovering energy from the reject stream to assist the feed pressurization, the free rotor booster pump serves as a fully self-regulating control element for the reverse osmosis or similar membrane separation apparatus. Passive speed adjustment of by the free rotor booster pump enables it to accommodate changing feed and membrane conditions over a wide range of conditions, maintaining good hydraulic matching between pump and turbine elements and the membranes. Other auxiliary control elements (such as throttle valves, adjustable nozzles, and variable speed pump drives) can be eliminated, for great simplification of both apparatus and process.

In order to appreciate the importance of the present invention, it must be realized that the fraction of the feed stream permeating the membrane is highly sensitive not only to applied pressure, but also to feed stream concentration and temperature, and the fouling and aging history of the membrane. The matching problem is compounded by the fact that centrifugal pumps and turbines have severely degraded performance when operated off their design flow and pressure parameters, while the changing hydraulic conditions of the membranes make the pressure and flows indeterminate. The free rotor booster pump allows its turbine and pump elements to seek their own most efficient combined operating point for any conditions of the feed and membranes, while also providing the desirable self-regulation control characteristic of reduced permeate/feed flow ratio for increased pressure. Operation is self-starting and stable upon initiation of feed stream flow. Operating complexity, equipment complexity, and energy losses of throttle valves and variable speed transmissions are avoided.

DISCLOSURE OF INVENTION

Pressure-driven membrane separation of a feed fluid stream is performed to separate the feed fluid into permeate and concentrate fractions which are respectively permeated and rejected by selective membranes. The feed fluid is admitted at an elevated working pressure to an inlet of membrane feed channels on one side of the selective membranes. As the feed fluid circulates through the membrane feed channels, permeate fluid permeates the membranes and is withdrawn from the low pressure side of the membranes through permeate collection channels, defining a ratio of permeate fluid flow to feed fluid flow. The remainder of the feed fluid rejected by the membranes becomes concentrated within the membrane feed channels to the concentrate fraction. As pressure drops due to flow friction in the membrane feed channels are typically small relative to the working pressure, the concentrate fluid leaves the outlet of the membrane feed channels at relatively high pressure.

An apparatus according to the invention includes the selective membrane means within a pressure vessel, and contacting a membrane feed channel on the higher pressure side of the membranes. The membrane feed channel has a feed channel inlet for the feed fluid and a feed channel outlet for the reject fluid.

The apparatus further includes a free rotor booster pump assembly comprising pump means and expander means, the pump means having a pump rotor and the expander means having an expander rotor, and the pump rotor and the expander rotor being mechanically coupled to each other, so that said expander means is the sole source of power for said pump means. In preferred embodiments, the pump and expander rotors will rotate about the same axis at the same speed, and may then be mounted on a common shaft serving as their direct mechanical coupling. In some embodiments, the pump and expander rotors may be integrated into a single rotor.

The pump means of the free rotor booster pump assembly is adapted to receive and pump the feed fluid to attain the working pressure. The pump means has an inlet to receive the feed fluid at an initial feed pressure from feed fluid supply means, and has an outlet in fluid communication with the membrane feed channel inlet to provide feed fluid at substantially the working pressure to the membrane feed channel.

The expander means of the free rotor booster pump assembly has an inlet in fluid communication with the membrane feed channel outlet, and is adapted to expand and exhaust the concentrate fluid so as to recover energy from the reject fluid to drive the pump means in order to boost the feed fluid from the initial feed pressure to the working pressure. In order to overcome efficiency losses in the pump means and the expander means, and also to overcome pressure drops due to flow friction in the membrane feed channel between the pump means outlet and the expander means inlet, the ratio of the initial feed pressure to the working pressure must be sufficiently greater than the ratio of the permeate fluid flow to the feed fluid flow.

In an important aspect of the present invention, the ratio of permeate flow to feed fluid flow declines (rises) as the working pressure rises (declines). This inverse relation between working pressure and the permeate/feed flow ratio enables the self-regulating control function of the free rotor booster pump in synergy with the membranes. Thus, large changes in membrane permeability are compensated passively by the free rotor booster pump, so that working pressure and the permeate/feed flow ratio both remain within relatively narrow ranges as required for good performance.

Neglecting minor corrections due to pressure drops and concentration polarization effects in the membrane feed channel, the permeate flow through reverse osmosis membranes is given by:

$$Qp = Qf - Qr = A(Pw - \pi)$$

where $Qp$ is the permeate flow, $Qf$ is the feed flow, $Qr$ is the concentrate fluid flow, $A$ is the product of membrane area and membrane permeability, $Pw$ is the working pressure in the membrane feed channel, and $\pi$ is the osmotic pressure of the feed fluid on the membrane surface. In general, both the membrane permeability and osmotic pressure may be highly variable, and to some extent uncontrollable. The membrane permeability is sensitive to temperature, often changing through a factor of two or three between tropical, temperate and arctic (or summer and winter) conditions. Membrane permeability declines with membrane aging and fouling, with somewhat unpredictable response to cleaning and chemical restorative procedures. The osmotic pressure is dependent of feed salinity, which may also vary widely. Salinity of brackish well water may increase rapidly with well drawdown, while sea water salinity experienced by ships is also highly variable with location.

For good system operation, it is desired to maintain good productivity expressed by $Qp$. To avoid excessive variations in $Q_p$ caused by unavoidable changes to membrane permeability or feed osmotic pressure, the working pressure must be adjusted to compensate for such changes. However working pressure must not be allowed to vary too widely, as excessive pressure is undesirable for efficiency and equipment life reasons, while overly low working pressure will cause reduced membrane salt rejection performance. It is also necessary to maintain feed flow $Q_f$ within design limits, so that sufficient circulation velocities are maintained in the membrane feed channel while excessive pressure drops are avoided. A fixed feed flow $Q_f$ may be prescribed by feed supply and pretreatment system design. The permeate/feed flow ratio $Q_p/Q_f$ must also be kept within design limits, with a low value reflecting loss of productivity and a high value associated with rise of concentrate osmotic pressure which will affect permeate quality and may damage the membranes.

The free rotor booster pump provides an inverse relationship between working pressure $P_w$ and the permeate/feed flow ratio $Q_p/Q_f$, so that reduced membrane permeability or increased osmotic pressure causes a modest decline in $Q_p$ and a modest rise in $P_w$, while maintaining pump and expander elements near their ideal operating hydraulic conditions for best efficiency. The free rotor booster pump achieves this desirable self-regulating cooperation with the membranes, with widely different feed supply means providing the feed fluid flow $Q_f$ at an initial feed pressure $P_i$. Of course, the pressure ratio $P_i/P_w$ must exceed the flow ratio $Q_p/Q_f$ since the expander means is the only power source to the pump means of the free rotor booster pump. The initial feed pressure $P_i$ is here taken as a total pressure, including any velocity head of $Q_f$ at the inlet of the pump means.

The feed supply means will in general define a convex relationship between $P_i$ and $Q_f$. Limiting cases are constant flow $Q_f$, as imposed by a constant speed positive displacement feed pump, and constant supply pressure $P_i$ as defined for example by a hydrostatic head or a municipal water supply. When the feed supply means includes a centrifugal pump, the initial feed pressure $P_i$ will droop with increasing flow $Q_f$ near its best efficiency point. Line friction losses will also cause $P_i$ from a nominally constant pressure source to droop with increasing $Q_f$. In each case, the apparatus combining the membrane means with the free rotor booster pump will select an operating point within the $P_i:Q_f$ relationship defined by the feed supply means. If $Q_f$ is constant, the apparatus will determine $P_i$. If $P_i$ is substantially constant, the apparatus will select $Q_f$. In all cases, the self-regulating characteristic of the apparatus will inhibit wide excursions of $Q_f$ and $P_i$, as well as $Q_p$ and $P_w$.

When the apparatus is starting, product flow is zero so $Q_r = Q_f$. The expander will thus generate excess torque to spin up the free rotor booster pump which in turn boosts the working pressure to generate permeate flow. If the free rotor booster pump and membranes become momentarily mismatched, the resulting torque imbalance will drive a compensating speed change to restore proper matching with complete stability. Thus, a decline in membrane permeability will cause an increase in concentrate flow, increasing expander torque so that the free rotor booster pump increases speed to increase working pressure moderately and thus reduce the extent of permeate flow reduction.

The pump means may be a centrifugal pump. The corresponding expander means may be a radial inflow turbine or an impulse turbine such as a Pelton turbine. Good self-regulation is provided by embodiments using a centrifugal pump as pump means and a radial inflow turbine as expander means. Excellent self-regulation is provided by the embodiment using a centrifugal pump as pump means and a Pelton turbine as expander means, allowing operation with substantially constant feed flow over a wide range of membrane conditions, without adjustment of the Pelton turbine nozzle.

The pump means may also be a rotary fixed displacement pump, and the expander means may likewise be a rotary fixed displacement expander. Rotary fluid displacement mechanisms such as gear or vane pumps (or motors) are characterized by significant volumetric slip, which here provides the desired characteristic of a declining permeate/feed flow ratio $Q_p/Q_f$ with rising working pressure $P_w$. In the absence of volumetric slip, the displacement ratio between rotary pump means and rotary expander means would define a fixed permeate/feed flow ratio, which has less desirable control characteristics in terms of self-regulation.

In a process according to the invention, a feed fluid is separated into permeate and concentrate fractions by providing the combination of selective membrane means with a free rotor booster pump comprising pump means and coupled expander means as the only power source for starting and driving the pump means. Feed fluid is admitted to the inlet of the pump means at the initial feed pressure, and is discharged from the outlet of the pump means to the feed channel inlet of the membrane means. Pressurized concentrate fluid from the feed channel outlet of the membrane means is admitted to the inlet of the expander means, and is depressurized by permitting free rotation of the expander means which causes simultaneous rotation of the pump means to pressurize the feed fluid to the working pressure at the pump means outlet.

In general, the process is further characterized by decrease (increase) of the ratio of the permeate fluid flow to the feed fluid flow with increase (decrease) of the working pressure. This permits the process to be self-regulating, so that permeate flow and working pressure both change with changes in membrane permeability, feed temperature or osmotic pressure, thus avoiding larger changes in either permeate flow or working pressure, while maintaining approximate matching in the pump means and the expander means between pressure and flow. The process may be operated without throttle valves between pump means outlet and the membrane feed channel inlet, or between the membrane feed channel outlet and the expander means inlet. When the expander means is a Pelton turbine, the process may be operated without adjustment of the turbine nozzle discharge coefficient, since adequate self-regulation is provided by speed variation of the free rotor booster pump.

The process is further characterized by self-starting of the free rotor booster pump upon initiation of feed fluid flow to the inlet of the pump means. The general relationship between feed fluid flow and the initial feed pressure is determined by the characteristics of the feed supply means, and the specific operating point is selected by cooperation between the membrane means and the free rotor booster pump.

DETAILED DISCLOSURE

FIG. 1

Figure 1:
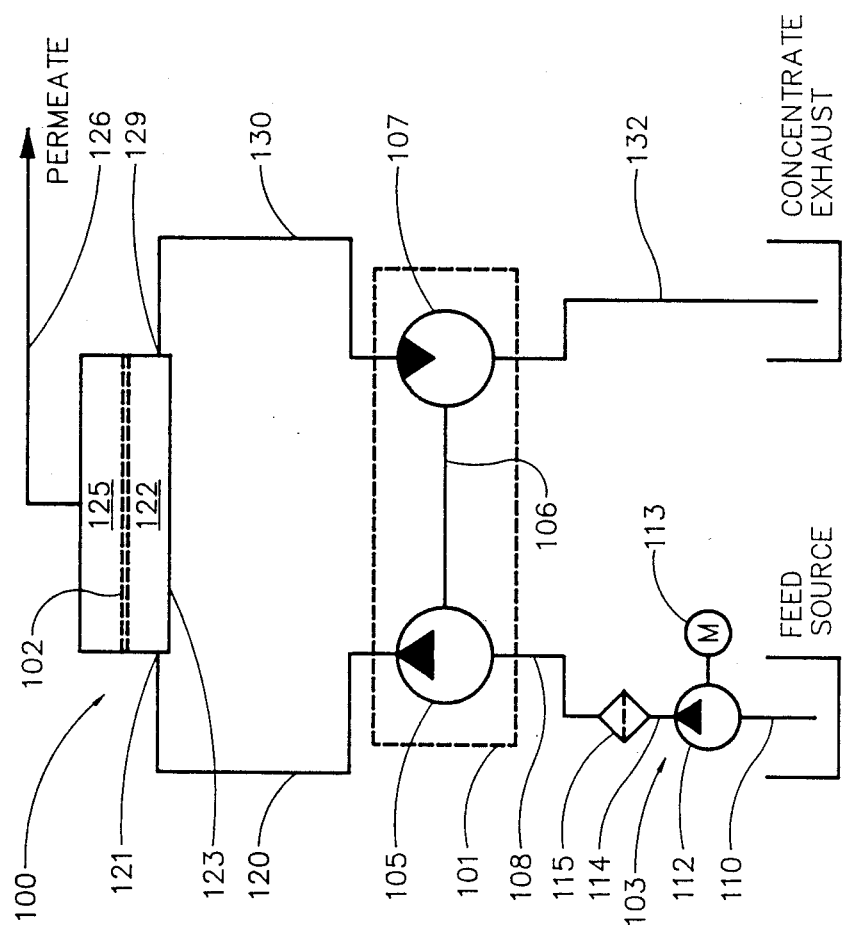
FIG. 1 is a simplified schematic of the invention with arbitrary pump and expander means.

FIG. 1 shows a general schematic of the invention. The apparatus 100 includes a free rotor booster pump assembly 101 coupled to selective membranes 102, and supplied with initially pressurized feed fluid from a feed supply means 103. Free rotor booster pump assembly 101 includes pump means 105 driven through mechanical connection 106 by expander means 107. Pump means 105 has a pump rotor coupled by mechanical connection 106 to an expander rotor of expander means 107, so that rotation of the expander rotor causes rotation of the pump rotor. Feed fluid entering the pump 105 through supply conduit 108 has already been pressurized to an initial feed pressure Pi. The illustrative feed supply means 103 includes inlet conduit means 110, initial pressure feed pump 112 driven by motor 113, and delivery conduit 114 connecting through optional filter 115 to supply conduit 108.

Pump 105 increases the pressure of the feed fluid from Pi to the working pressure Pw, and discharges the pressurized feed fluid into conduit 120 which communicates to the feed channel inlet 121 of membrane feed channel 122 in membrane pressure vessel 123. As the pressurized feed fluid flows along the membrane feed channel, it contacts the membranes 102 which consititute a wall of the feed channel. A permeate fraction of the feed fluid permeates the membranes 102, and is collected in low pressure product collection channel 125 for delivery through permeate conduit 126. By depletion of the permeate fraction, the feed fluid becomes concentrated to a reject or concentrate fraction at the outlet 129 of the feed channel 122. The still pressurized concentrate fluid leaves the membrane feed channel and the membrane pressure vessel 123 at feed channel outlet 129, which communicates by conduit 130 to expander 107. The concentrate fluid is expanded in expander 107 to a low exhaust pressure, and is removed from the apparatus through exhaust conduit 132.

The pump means receives the feed fluid at the initial feed pressure, and pumps the feed fluid to the working pressure of the membranes. The pressurized feed fluid is circulated over the membrane surfaces contacting the membrane feed channel, and the fraction which is not permeated by the membranes becomes concentrate fluid still almost at the working pressure. The concentrate fluid is exhausted by the expander means, and the energy recovered from the concentrate fluid is applied to boost the pressure of the feed fluid.

In the idealized absence of any pressure drops in the membrane feed channel and any efficiency losses, the ratio of the theoretical initial feed pressure to the working pressure is equal to the permeate/feed flow ratio, as follows from conservation of energy. In practice, the initial feed pressure must be somewhat higher, to overcome losses. The process of this invention is inherently self-regulated and stable, with the operating point determined by cooperation of the membranes with the free rotor booster pump, and the characteristics of the feed supply means.

In preferred embodiments, the pump means and expander means of the free rotor booster pump assembly rotate at the same speed about the same axis, so that mechanical connection 106 between the pump rotor of pump means 105 and expander rotor of expander means 107 may be provided as a shaft 106 on which the pump rotor and expander rotor are both mounted. The pump rotor and expander rotor may be further integrated as a single rotor.

For most applications except those with small flows and relatively low working pressures (i.e., tap water pressure at initial feed) where a rotary positive displacement pump may be used, the pump means will be a centrifugal pump. Suitable turbine types to be used as the expander means coupled to a centrifugal pump are radial inflow reaction turbines (Francis turbine or reverse-running centrifugal pump) and impulse turbines (Pelton turbine). While the invention is applicable to pressure-driven membrane separation of feed fluids which may be incompressible or compressible, the following analysis will be concerned with the important application of reverse osmosis water desalination and will thus assume incompressibility.

FIG. 2

Figure 2:
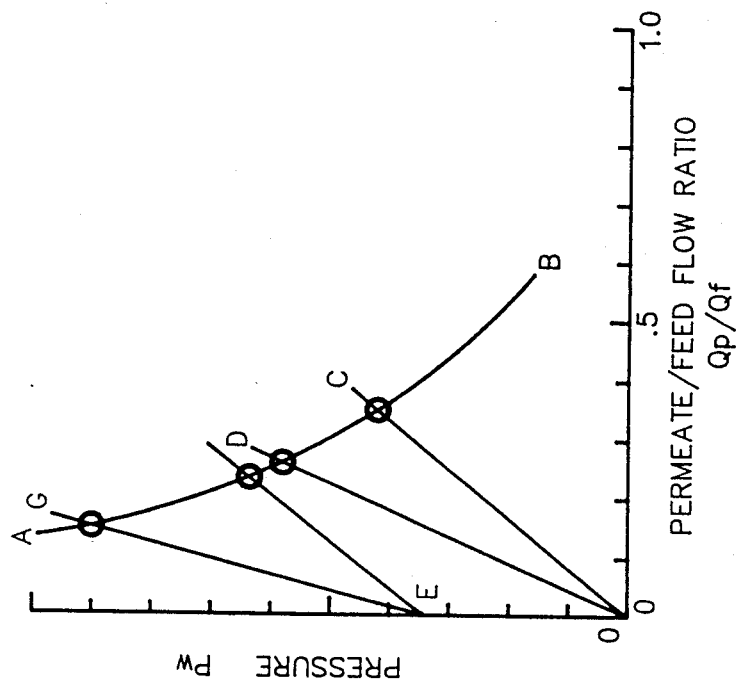
FIG. 2 shows the relation of working pressure versus permeate/feed flow ratio, and the variation of operating point with feed osmotic pressure and membrane permeability.

FIG. 2 shows a typical characteristic (curve A-B) between working pressure and the permeate/feed flow ratio, for embodiments of FIG. 1 in which pump means 105 is a centrifugal pump, and expander means 107 is either a reaction (radial inflow) turbine or an impulse (Pelton turbine). Curve A-B in FIG. 2 shows the typical inverse relation between Pw and Qp/Qf defined by these free rotor booster pump embodiments, providing self-regulation. Such curves for Pw versus Qp/Qf were derived by mathematical modelling using the hydraulic similarity laws for centrifugal pumps, radial turbines and Pelton turbines. Derivation of this characteristic is illustrated graphically in FIG. 3 for the reaction turbine case, and in FIG. 4 for the Pelton turbine case. The free rotor booster pump characteristic will be modified but qualitatively similar for different assumptions about feed supply means parameters and pressure drop in the membrane feed channel.

Also shown in FIG. 2 are load lines defined (for constant Qf) by the membranes under different osmotic pressure, membrane permeability and feed temperature conditions. The operating point of the apparatus is defined by the intersection of the given membrane load line with the characteristic defined by the free rotor booster pump and the feed supply means. The intercept of the membrane load line with the vertical working pressure axis is the effective osmotic pressure of the feed fluid. The slope of the membrane load line is the inverse of the permeability, for fixed membrane area. This slope will become steeper as the membranes deteriorate with flux decline or fouling, or if the temperature of the feed fluid is reduced.

Thus, line O-C represents a load line for membranes in good condition, with warm feed water of low salinity (zero osmotic pressure). Steeper line O-D illustrates the effect of membrane deterioration or lower feed temperature, for zero osmotic pressure. Line E-F is a typical load line for membranes in good condition, with warm sea water feed, while line E-G shows the effect of lower membrane permeability or cooler feed at the same osmotic pressure. The operating points corresponding to the above load lines are circled on FIG. 2. This actual example is based on design analysis for a shipboard desalination plant, required to operate without operator adjustments in any ocean area as well as fresh water estuaries. It is seen that the self-regulating cooperation between the free rotor booster pump and the membranes keeps the range of working pressures and permeate/feed flow ratios within acceptable bounds. Working pressure would vary too extremely if the system were operated at constant Qp/Qf, while the permeate/feed flow ratio would vary too widely if working pressure were held constant. A conventional fixed speed hydraulic turbine could only accommodate much less drastic changes in membrane conditions, and requires operator adjustment of valves or nozzles to compensate even minor changes.

FIG. 3

Figure 3:
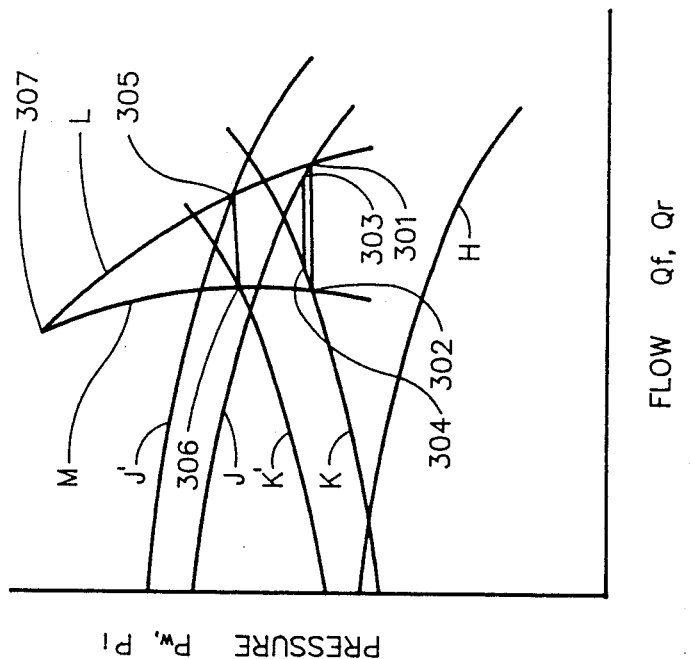
FIG. 3 shows flow and pressure relationships for a free rotor booster pump with centrifugal pump and radial inflow turbine.

FIG. 3 illustrates the generation of the free rotor booster pump characteristic, for the embodiment of FIG. 1 with a centrifugal pump as pump means 105 and a radial inflow reaction turbine as expander means 107. In FIG. 3, curve H defines a typical assumed feed supply means as initial feed pressure Pf versus feed flow Qf. This feed supply means may be a centrifugal pump 112 in FIG. 1. For a free rotor booster pump shaft speed N, curve J describes the working pressure Pw versus feed flow Qf, and curve K describes the turbine entry pressure versus concentrate fluid flow Qr. Curve J is the sum of the pressure boost of centrifugal pump 105 and the initial feed pressure Pf given by curve H. With an assumed pressure drop in the membrane feed channel reducing the turbine entry pressure for the nominal working pressure, a torque balance for the free rotor booster pump at speed N (with this feed supply means) defines a unique pump operating point 301, and turbine operating point 302. It may be noted that disc friction of the pump and turbine rotors contributes importantly to the torque balance.

If the permeate flow (Qp=Qf−Qr) of the membrane at working pressure Pw matches pump operating point 301 and turbine operating point 302, the free rotor booster pump will operate at assumed speed N. Suppose that the effective membrane permeability has declined, owing to fouling, feed temperature decrease, or feed salinity increase. With the free rotor booster pump still operating at speed N, the pump shifts to new operating point 303 while the turbine shifts to new operating point 304. Owing to relatively shallow slopes of curves J and K, the permeate flow Qp drops greatly while working pressure Pw rises only slightly. This indicates why a conventional constant speed centrifugal pump with constant speed energy recovery reaction turbine must be supplemented with adjustable throttle valves to prevent wide variations in permeate productivity and power demand. A throttle valve between pump outlet and feed channel inlet, and/or between feed channel outlet and turbine inlet, provides scope to compensate reduced membrane permeability by adjusting membrane working pressure, with penalties in efficiency and operating complexity.

Of course, the free rotor booster pump is not constrained to constant speed. At speed N, turbine operating point 304 yields greater driving torque than balanced operating point 302, while pump operating point 303 demands less torque than balanced operating point 301. The excess torque thus immediately causes the free rotor booster pump to accelerate to a higher speed. With the reduced membrane permeability, a new balance point may be found at new higher speed N', defining new pump operating point 305 and new turbine operating point 306 based again on torque balance. The locus of balanced pump operating points is provided by curve L intersecting points 301 and 305, while the locus of balanced turbine operating points is provided by curve M intersecting points 302 and 306. Curves L and M intersect at point 307, where permeate flow Qp becomes zero. Point 307 defines a self-limiting maximum speed and maximum pressure for the apparatus, which could only be reached in the event of total membrane blockage. The horizontal distance between curves L and M yields curve A-B of FIG. 2.

In the example of FIG. 3, concentrate fluid flow is held roughly constant by the predicted hydraulic characteristics of the free rotor booster pump with the given feed supply means. Feed flow declines with rising working pressure and rising booster shaft speed, so the centrifugal pump section of the booster should be designed for good efficiency at off-design conditions if wide variations in effective membrane permeability are to be accommodated. The same free rotor booster pump will have modified performance if the feed supply means is different. Thus, feed flow may be held constant by using a reciprocating plunger pump for initial pressure feed pump 112 (and a constant speed motor 113) of FIG. 1. With constant feed flow, concentrate fluid flow Qr increases with higher working pressure and higher free rotor shaft speed, so that departures from optimum hydraulic conditions for centrifugal booster pump and reaction turbine will be relatively slight. However, curve A-B in FIG. 2 is only changed slightly by this major change in feed supply means.

FIG. 4

Figure 4:
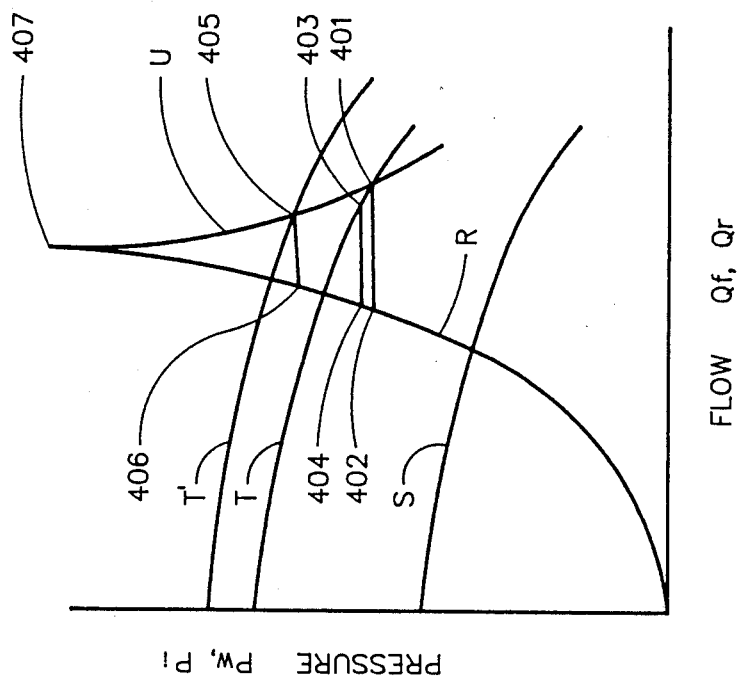
FIG. 4 shows flow and pressure relationships for a free rotor booster pump with centrifugal pump and Pelton turbine.

FIG. 4 shows typical calculated hydraulic curves for a free rotor booster pump using a centrifugal pump for pump means 105 and a Pelton impulse turbine for expander means 107 of FIG. 1.

Parabolic curve R shows the turbine entry pressure versus concentrate fluid flow Q, for a Pelton wheel nozzle with fixed discharge coefficient. Curve S shows the assumed feed supply means characteristic of Pi versus Qf, typical for a centrifugal pump 112 in FIG. 1. The Pelton wheel rotor and centrifugal booster pump rotor rotate at the same nominal shaft speed N. At shaft speed N, the working pressure Pw is given by curve T (initial feed pressure plus pressure boost by pump 105). A torque balance between the Pelton wheel and the centrifugal booster pump at speed N (with an assumed pressure drop from the working pressure to the turbine entry pressure) defines a pump operating point 401 on curve T, and a turbine operating point 402 on curve R.

If membrane effective permeability dropped while free rotor shaft speed was artificially held at speed N, the pump operating point might move to new operating point 403, while the turbine would move to new operating point 404. As in the similar discussion for FIG. 3, the shallow slope of the pump characteristic at constant speed causes wide variations in permeate flow and power while working pressure changes slightly. In a conventional system with constant speed centrifugal pump and constant speed Pelton turbine, such unsatisfactory response would be remedied by adjustment of the Pelton turbine nozzle, and probably also by using a throttle valve between the pump and the membrane feed channel inlet. Since pump torque demand would drop while turbine torque would rise, the present invention provides self-regulation to compensate for the assumed decrease in effective membrane permeability by passively shifting free rotor speed to a new stable operating speed N' defining new balanced pump operating point 405 and turbine operating point 406 based on a restored torque balance. Curve U is the locus of pump operating points, generated by points 401, 405 and similar points for other speeds. The horizontal separation between curves U and R yields permeate flow as a function of working pressure, and thus provides a free rotor booster pump characteristic similar to curve A-B in FIG. 2. The intersection of curves U and R at point 407 again defines a maximum pressure condition where permeate flow has vanished.

Figure 5:
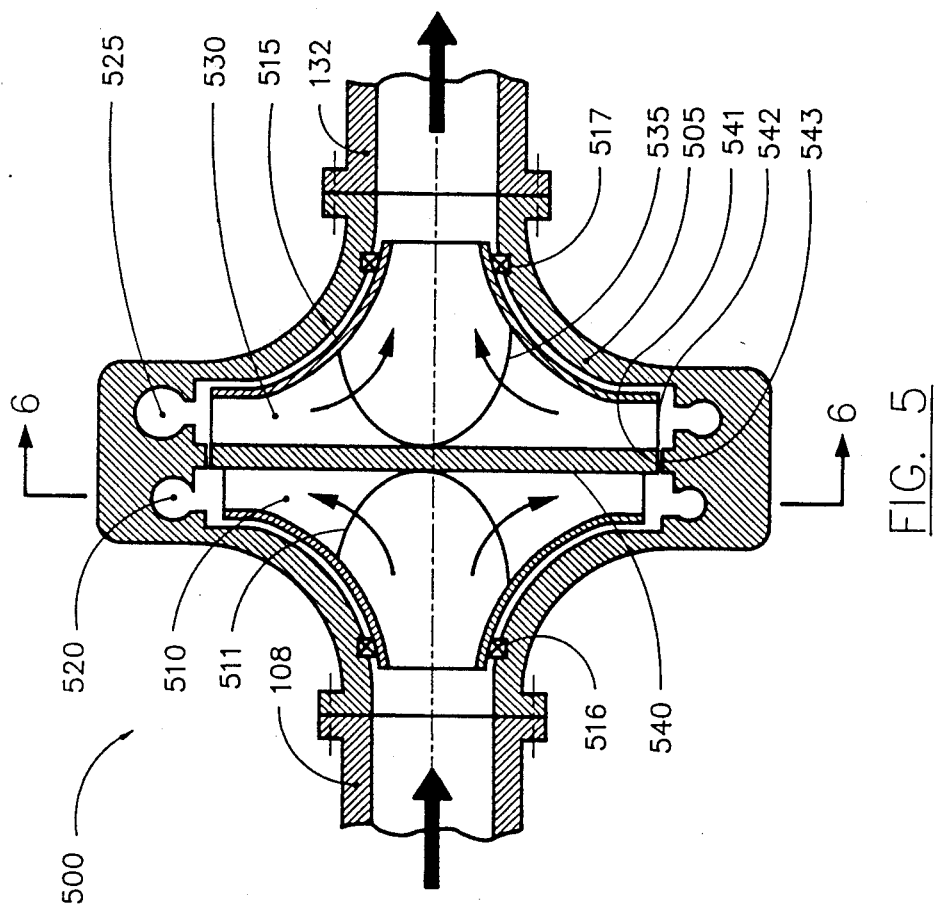
FIG. 5 is a schematic of the invention using integrated centrifugal pump and expander means.
Figure 6:
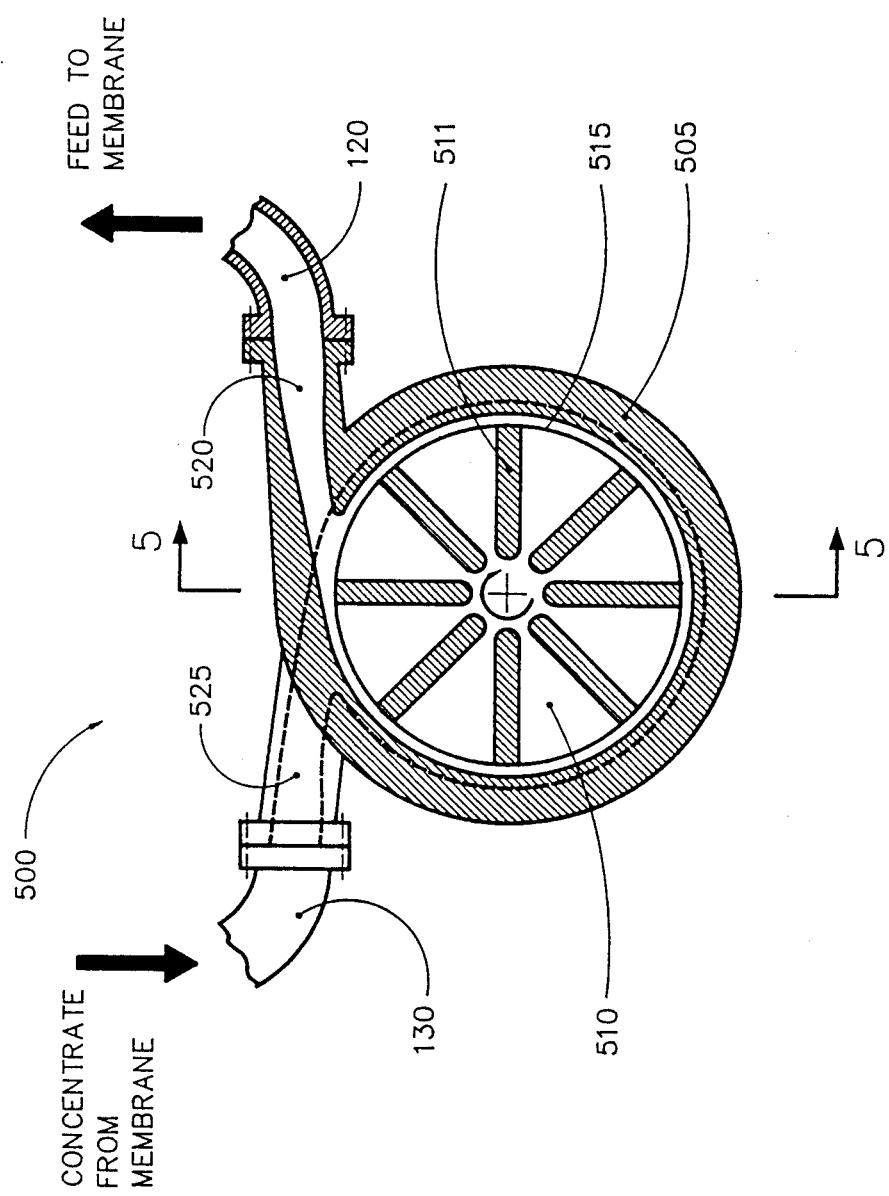
FIG. 6 is section A—A of FIG. 5.

FIGS. 5 and 6

FIGS. 5 and 6 show an example of a free rotor booster pump assembly, in which the pump and expander are a centrifugal pump and radial inflow turbine respectively. In the free rotor booster pump assembly 500 depicted, the centrifugal pump impeller is integrated with the turbine runner. This integration minimizes disc friction power losses as there is only one rotor. Conduit connections to the free rotor booster pump assembly are numbered in accordance with FIG. 1.

FIG. 6 is section A—A of FIG. 5, and FIG. 5 is section C—C of FIG. 6. In FIGS. 5 and 6 the initially pressurized feed enters booster pump casing 505 through conduit 108, and flows into pump impeller passages 510 defined by vanes 511 within rotor 515. Rotor 515 is supported by radial bearing 516 and combined radial and thrust bearing 517. Rotation of rotor 515 accelerates and pressurizes the feed fluid flowing radially outward in passages 510. Leaving passages 510, the feed fluid is collected and decelerated in diffuser 520 to attain the full working pressure Pw. Diffuser 520 discharges into conduit 120 communicating with the membrane feed channel inlet.

Concentrate fluid returning from the membrane feed channel outlet via conduit 130 enters turbine nozzle 525, which accelerates the concentrate fluid to a suitable velocity for entering the turbine runner channels 530, which are defined by turbine vanes 535. Concentrate fluid flowing radially inward is decelerated and depressurized in channels 530 before discharge through exhaust conduit 132. Turbine runner channels 530 are separated from pump impeller passages 510 by rotor disc 540. The rim 541 of rotor disc 540 is separated by a narrow annular clearance gap 542 from sealing face 543 within casing 505.

Figure 7:
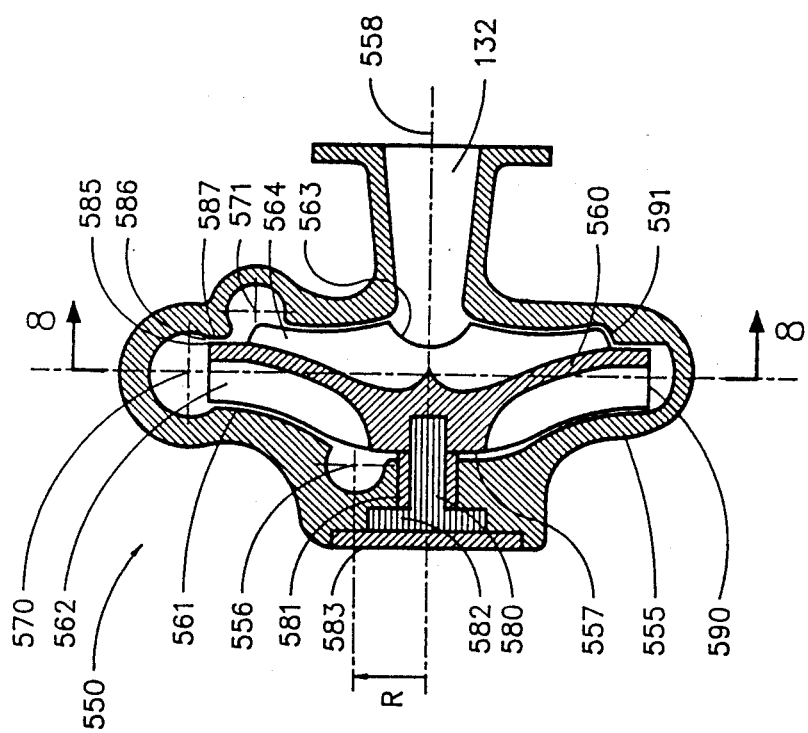
FIG. 7 shows an alternative centrifugal embodiment with improved axial balance.
Figure 8:
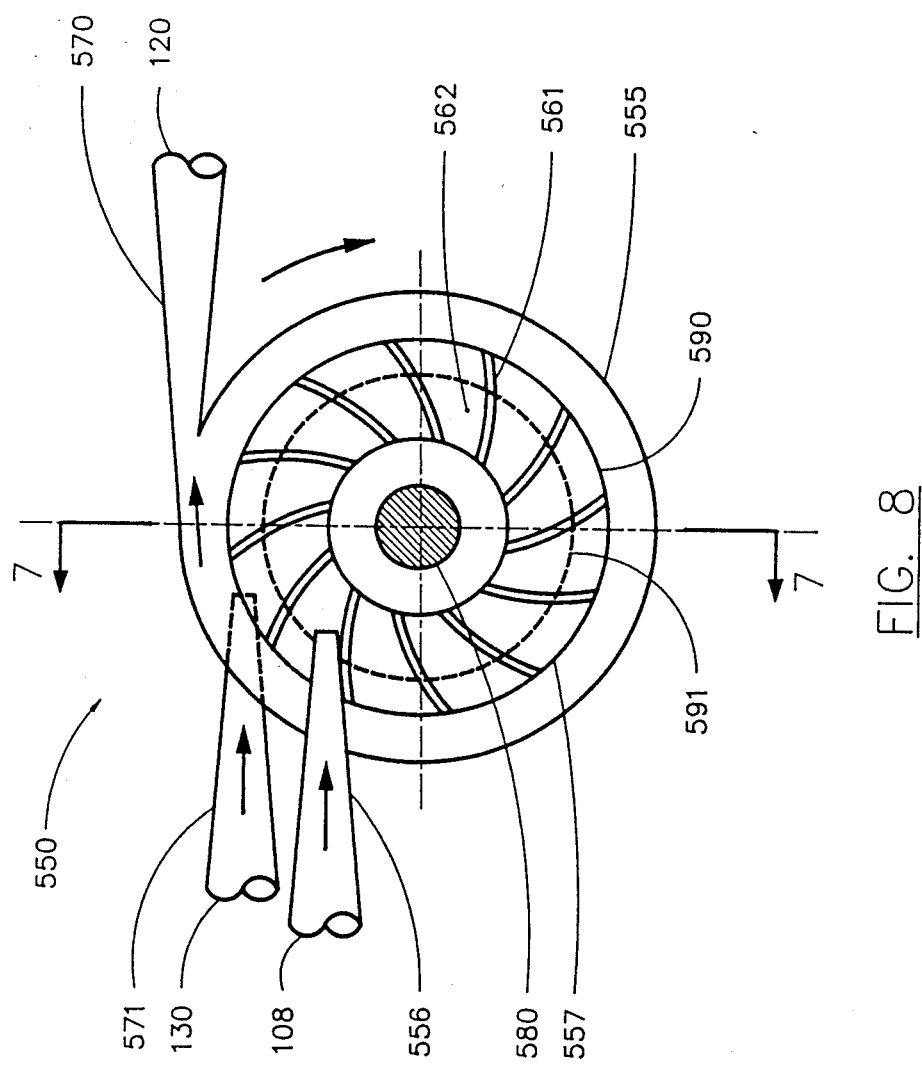
FIG. 8 is section D—D of FIG. 7.

FIGS. 7 and 8

The centrifugal free rotor booster pump of FIGS. 5 and 6 has the advantage of low disc friction owing to back-to-back integration of the pump impeller and turbine runner; but the pressure excess on the pump side of the rotor will cause large thrust bearing loads due to axial imbalance, and will also cause leakage through the clearance gap across the rotor rim from pump to turbine. These difficulties are alleviated in the embodiment 550 of FIGS. 7 and 8, in which axial balance is approached by admitting the feed fluid to the pump impeller through a nozzle converting about half of the initial feed pressure to velocity head, so that the diameter of the pump impeller is increased and approximate pressure balance across the rotor disc is achieved at all radii.

FIG. 7 is section E—E of FIG. 8, and FIG. 8 is section D—D of FIG. 7. The initially pressurized feed enters casing 555 through inlet nozzle 556 which receives the feed fluid from conduit 108. Nozzle 556 injects the feed fluid tangential to the rotor 557, at radius "R" from the axis 558 of rotor 557, and on the pump impeller side of the rotor. Rotor 557 includes a rotor disc 560, to which pump vanes 561 defining pump impeller channels 562 and turbine vanes 563 defining turbine runner channels 564 are attached on pump impeller and turbine runner sides respectively.

Rotation of rotor 557 accelerates and pressurizes the feed fluid flowing radially outward in the pump impeller channels 562. The feed fluid is then collected and decelerated in pump diffuser 570 discharging to conduit 120 communicating with the membrane feed channel inlet. Concentrate fluid returning from the membrane feed channel outlet via conduit 130 enters turbine nozzle 571, which accelerates the concentrate fluid to a suitable velocity for entering the turbine runner channels 564. Concentrate fluid flowing radially inward in channels 564 is depressurized before discharge through exhaust conduit 132.

Rotor 557 is mounted on shaft 580, which is supported by radial bushing 581. Shaft 580 has a collar 582 reacting against thrust bearing plate 583, and defining the location of rotor 557 along axis 558. Rotor disc 560 has a sealing face 585 defining a narrow clearance gap 586 against sealing face 587 of the casing 555. The radius "R" at which the feed fluid is injected from nozzle 556 into pump impeller channels 562 is selected so that static pressures within pump impeller channels and turbine runner channels are approximately equal at each radius from the axis, so that axial balance is approached. The blade angles and curvature of pump vanes 561 and turbine vanes 563 may also be selected to adjust the approach to axial balance.

Nozzle 556 will convert up to half of the total initial feed pressure to velocity head. Radius "R" is determined in part by the matching condition that the injection velocity of the feed fluid discharging from nozzle 556 will be approximately equal to the tangential velocity of the rotor at radius "R". Since the inner radius of the pump impeller channels is defined by the relatively large radius "R", and the total pressure at the entrance to pump diffuser 570 must be greater than the total pressure at the exit of turbine nozzle 571, the pump impeller diameter 590 is significantly greater than turbine runner diameter 591. Hence, clearance gap 586 has a substantial radial dimension, providing a pressure gradient inhibiting leakage from pump to turbine. Larger impeller diameter 590 of course increases disc friction. Thus, the final design compromise between objectives of achieving axial thrust balance, minimizing leakage in the clearance gap, and minimizing disc friction will be reached by design of nozzle 556, radius "R", and vane blade angles and curvature.

It will be seen that embodiment 550 is characterized by admitting the feed fluid to the centrifugal impeller with a velocity head which is a substantial fraction (up to half) of the total initial feed pressure. The pump impeller and turbine runner are integral with a single combined rotor for reducing disc friction losses, and are mounted back-to-back within this rotor, with the pump impeller having a greater diameter than the turbine runner because of the injection to the feed fluid to the impeller at a radius where the velocity of the feed fluid entering the impeller is approximately matched to the tangential velocity of the rotor at that radius, so as to reduce net axial thrust due to pressure imbalance and also reduce leakage between pump and turbine sides of the rotor. In embodiment 550, a inlet nozzle is used to convert a portion of static head of the initially pressurized feed to velocity head.

FIG. 9

Figure 9:
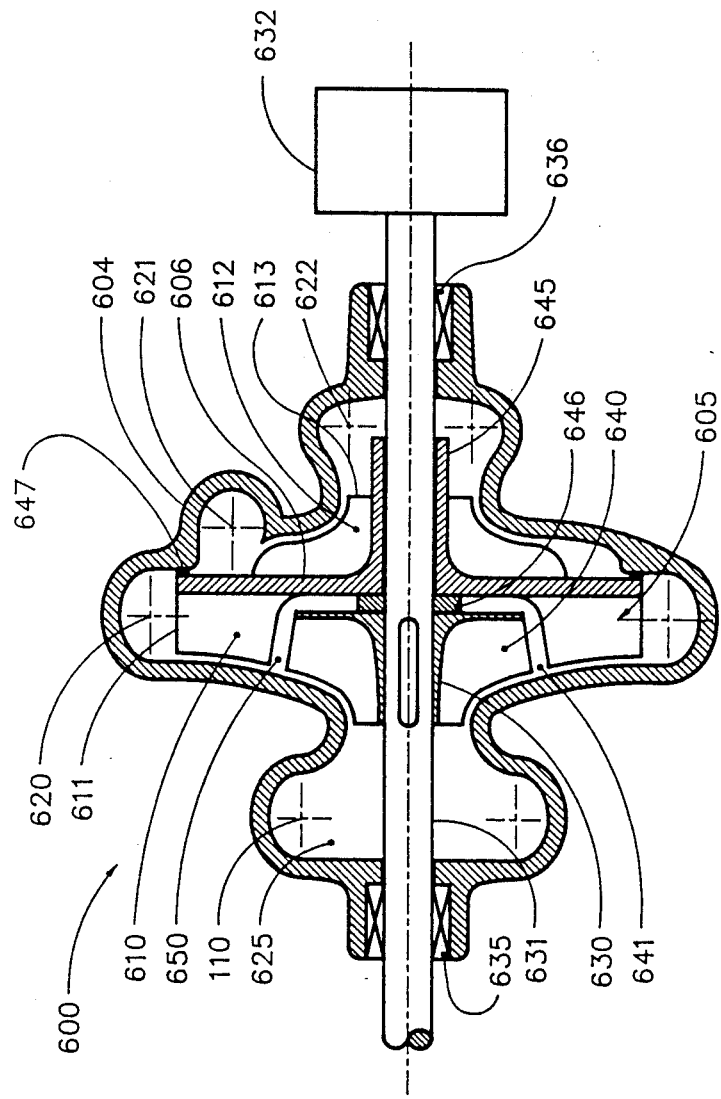
FIG. 9 shows a centrifugal embodiment, in which a coaxial feed pump impeller is the power source and provides the total initial feed pressure as combined static and velocity head.

Another centrifugal embodiment 600 of the invention is provided in FIG. 9. This embodiment also uses the principle of injecting the feed fluid with a substantial velocity head into the pump impeller, but uses a driven feed impeller (coaxial to the free rotor of the booster pump) to generate the static head and velocity head equivalent to a total initial pressure of the feed fluid.

Embodiment 600 has a casing 604, and a free rotor 605 having a rotor disc 606. The rotor disc has back-to-back pump and turbine sides. Pump impeller channels 610 are defined by pump vanes 611 attached on the pump side of rotor disc 606, and turbine runner channels 612 are defined by turbine vanes 613 attached to the opposite turbine side of the rotor disc 606. Pressurized feed flow leaving the pump impeller channels is collected in diffuser 620, which discharges to conduit 120 (not shown). Concentrate returning from the membranes via conduit 130 (not shown) is accelerated by nozzle 621 injecting the concentrate fluid to the outer diameter of the turbine runner channels 612. Depressurized concentrate leaving turbine runner channels 612 is exhausted from exhaust volute 622.

Low pressure feed fluid enters the casing 604 through suction volute 625, inducting the feed from conduit 110 shown in FIG. 1. The feed fluid in suction volute 625 is forced radially outward and accelerated tangentially by feed pump impeller 630. Feed pump impeller 630 is mounted on and keyed to drive shaft 631, which is driven by motor 632. Drive shaft 631 is supported and located radially and axially by bearings 635 and 636, which include appropriate low pressure shaft seals. The feed pump impeller 630 has vanes 640 whose outer radius at vane tips 641 is "R". The effective blade angle of vanes 640 may be 90 degrees, in which case the feed fluid discharged outward from the feed pump impeller will have approximately equal static and velocity heads at radius "R" (augmented from the low suction pressure). The total head at radius "R" is equivalent to the initial feed pressure of other embodiments described above.

Rotor 605 rotates concentrically about drive shaft 631, on hub bushing 645. Rotor 605 is located axially by thrust washer 646, and by the narrow clearance gap 647 at the rim of rotor disc 606. A narrow annular vaneless gap 650 between the outer radius "R" of the feed pump impeller 630 and the inner radius of the pump vanes 611 provides a transition for feed fluid leaving the feed pump impeller and entering the pump impeller channels 610, so that the feed fluid is admitted substantially directly to the inlet of the free rotor centrifugal pump impeller from the feed pump impeller. The turbine vanes 613 impart a driving torque to rotor 605, overcoming the torque required by pump vanes 611 and for disc friction, so that the rotor 605 revolves at a speed which is desirably approximately the same as the rotational speed of feed pump impeller 630.

Embodiment 600 provides similar advantages to embodiment 550, as the injection to the free rotor pump impeller of high velocity feed at radius "R" enables a larger outer diameter of the pump impeller to the turbine vanes, so that the free rotor may have approximate axial balancing and low leakage through the clearance gap between pump and turbine. Embodiment 600 provides the further advantage of integration between the free rotor booster and the feed pump. Unlike conventional two stage centrifugal pumps, no diffuser is required between the feed pump impeller and the impeller of the booster pump. Elimination of intermediate diffusion losses thus improves overall efficiency, although disc friction is relatively high owing to large impeller diameter. This embodiment acts as a fluid coupling during starting transients, although slip between the feed pump impeller and the free rotor should be kept low under running conditions. In order to reduce disc friction, the feed pump impeller may revolve at somewhat higher speed than the free rotor.

Other variations of this aspect of the invention are possible. In particular, the free rotor booster pump may take the form of a pitot tube pump, in which the casing revolves external to a stationary diffuser, so that the revolving casing acts as the impeller. This casing might be used as the hub of a pelton wheel serving as the turbine. The feed fluid can be injected into the rotating casing at a desired radius "R", either by a fixed nozzle as in embodiment 550, or by a coaxial rotating feed pump impeller as in embodiment 600.

Figure 10:
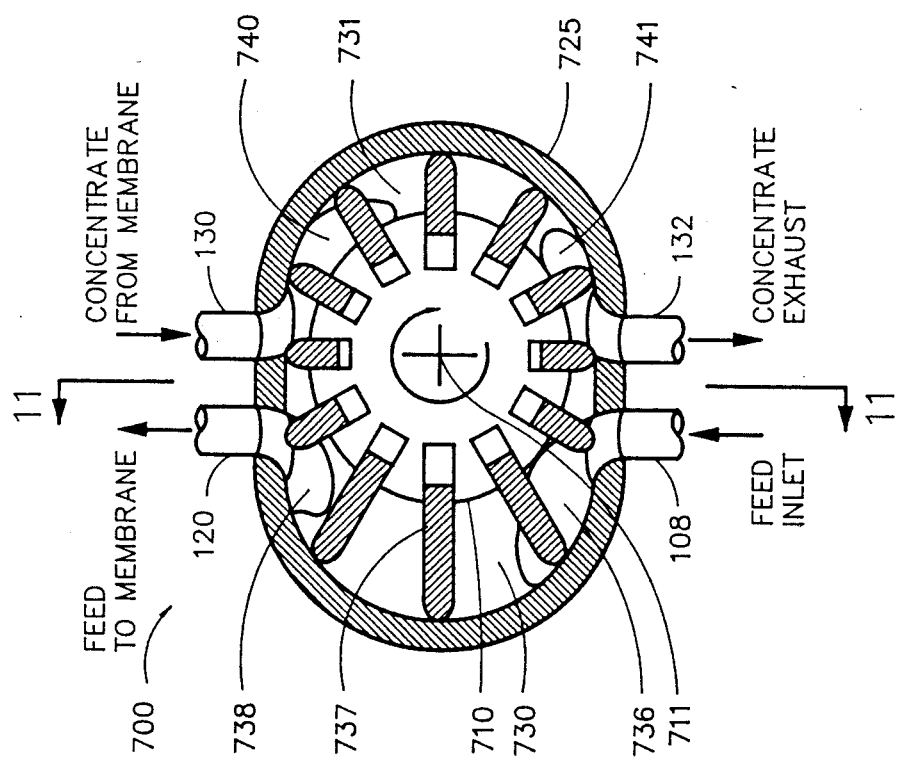
FIG. 10 is a schematic of the invention using a vane booster pump with a common rotor for both pump and expander.
Figure 11:
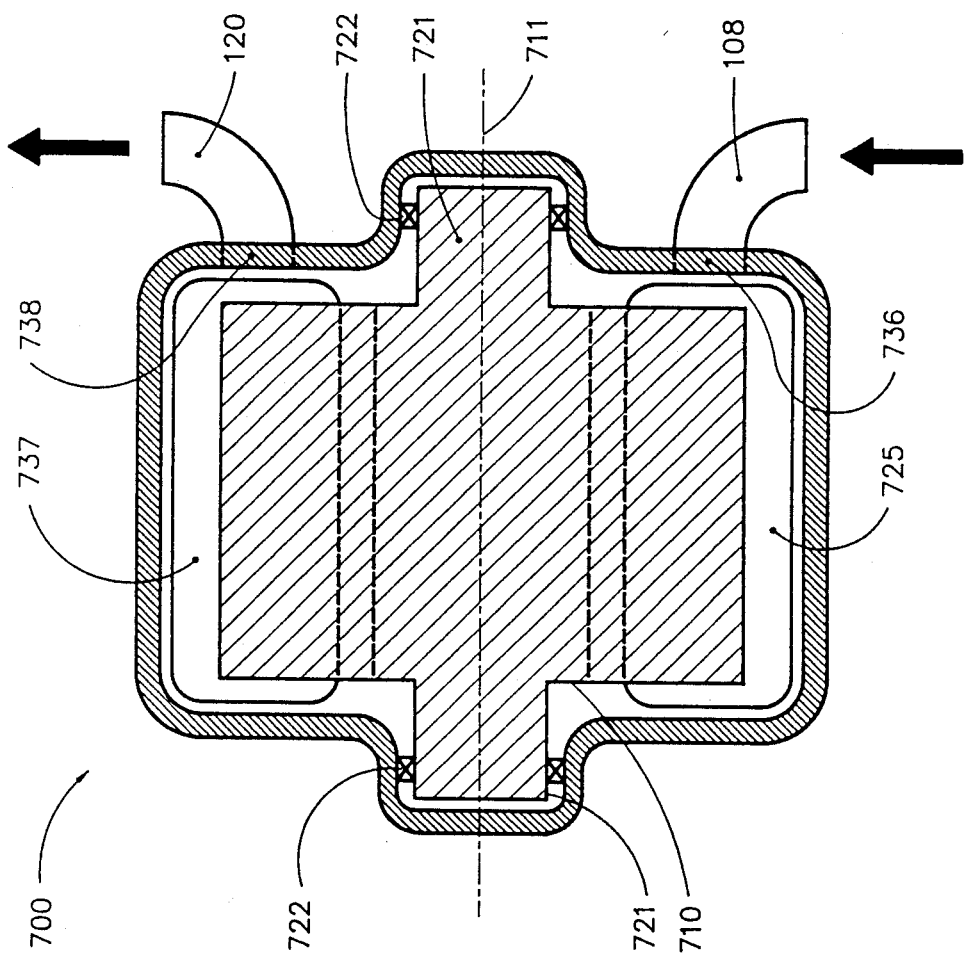
FIG. 11 is section B—B of FIG. 12.

FIGS. 10 and 11

FIG. 10 and 11 show another embodiment 700 of the free rotor booster pump assembly, in which pump and expander are both rotary positive displacement devices. Numerous rotary positive displacement devices may be considered, including gear pumps and motors, gerotor pumps and motors, peristaltic pumps and motors, screw pumps and motors, etc. In the depicted embodiment, a vane pump and motor are integrated with a single rotor in an asymmetirc double lobed casing. This very compact configuration provides an approximate hydraulic balance, and reduces leakage and friction effects expected with the more conventional arrangement of a separate vane pump and vane motor on a common shaft.

FIG. 11 is section B—B of FIG. 10. In FIGS. 10 and 11, rotor 710 rotates around axis 711, with stub shafts 721 supported by bearings 722 in casing 725. Casing 725 has two interior lobes asymmetric to axis 711, the larger lobe 730 corresponding to the pump swept volume and the smaller lobe 731 corresponding to the expander swept volume. Conduit connections to the casing 725 are numbered in accordance with FIG. 1.

Initially pressurized feed fluid enters lobe 730 from conduit 108 via pump inlet port 736, and is swept by vanes 737 to pump discharge port 738. Fully pressurized feed fluid leaves port 738 through conduit 120 communicating to the membrane feed channel inlet. Concentrate fluid from the membrane feed channel outlet returns via conduit 130, and enters lobe 731 through expander inlet port 740. Vanes 737 meter concentrate fluid through lobe 731 from inlet port 740 to exhaust port 741, from which depressurized concentrate fluid is exhausted through exhaust conduit 132.

Because friction and leakage losses are relatively high in rotary positive displacement pumps and motors, the embodiment 700 is preferred for operation at low pressures and small flows, as for example in domestic tap water purification by reverse osmosis. Boosting the working pressure above tap water feed pressure will enhance membrane salt rejection performance, productivity and recovery. Since volumetric leakage in both pump and expander sections of this embodiment increases with working pressure, the permeate/feed flow ratio declines with higher pressure as desired for satisfactory self-regulation.

It will be evident that the invention as defined by the following claims may be expressed in many embodiments alternative to those examples described above.

I claim:

1. Apparatus for separation of a feed fluid into permeate and concentrate fluid fractions by subjecting the feed fluid to a working pressure over selective membrane means, the membrane means permeating the permeate fluid and rejecting the concentrate fluid to define a ratio of permeate fluid flow to feed fluid flow, the apparatus comprising:
   (a) the membrane means contacting a membrane feed channel within a pressure vessel, the membrane feed channel having a feed channel inlet for the feed fluid and a feed channel outlet for the concentrate fluid,
   (b) free rotor booster pump assembly comprising pump means and expander means, the pump means having a pump rotor and the expander means having an expander rotor, and the pump rotor and expander rotor being mechanically coupled to each other, so that said expander means is the sole source of power for said pump means,
   (c) said pump means being adapted to receive and pump the feed fluid to attain the working pressure, and having an inlet to receive the feed fluid from a feed fluid supply means at an initial feed pressure, and also having an outlet in fluid communication with the feed channel inlet to provide feed fluid at substantially the working pressure to the inlet of the membrane feed channel,
   (d) said expander means having an inlet in fluid communication with the feed channel outlet, and being adapted to expand and exhaust the concentrate fluid, so as to recover energy from the concentrate fluid to drive the said pump means in order to boost the feed fluid pressure from the initial feed pressure to the working pressure, the ratio of the initial feed pressure to the working pressure being sufficiently greater than the ratio of the permeate flow to the feed fluid flow so as to overcome efficiency losses, and the free rotor booster pump has the characteristic of decreasing the ratio of permeate fluid flow to feed fluid flow as the working pressure developed by the free rotor booster pump rises in response to increased resistance of the membrane means to the permeate flow.

2. The apparatus of claim 1, in which the pump rotor and turbine rotor are directly coupled to rotate about the same axis at the same speed.

3. The apparatus of claim 1, in which the rotary pump means is a centrifugal pump.

4. The apparatus of claim 3, in which the expander means is a radial inflow turbine.

5. The apparatus of claim 4, in which the pump rotor is a centrifugal pump impeller, the expander rotor is a turbine runner, and said impeller and said runner are integral with a single combined rotor for reducing disc friction losses.

6. The apparatus of claim 5, in which the impeller and runner are mounted back-to-back on the rotor.

7. The apparatus of claim 6, with an inlet nozzle to convert a portion of the initial feed pressure at the inlet of the pump to velocity head, the inlet nozzle also injecting the feed fluid to the impeller at a sufficient radial distance from the axis of rotation so as to reduce axial thrust due to pressure imbalance across the rotor, and also to reduce leakage at the edge of the rotor between the pump means and the turbine means at the rim of the rotor.

8. The apparatus of claim 6, with a feed pump impeller driven to generate the total initial feed pressure as partly static head and partly velocity head, the feed pump impeller rotating coaxially with the pump means so that feed fluid discharged by the feed pump impeller is admitted substantially directly to the inlet of the centrifugal pump impeller.

9. The apparatus of claim 8, in which the static head and the velocity head are substantially equal portions of the total initial feed pressure at the inlet of the centrifugal pump impeller.

10. The apparatus of claim 3, in which the expander means is an impulse turbine.

11. The apparatus of claim 10, in which the impulse turbine is a Pelton turbine.

12. The apparatus of claim 1, in which the pump means is a rotary fixed displacement pump and the expander means is a rotary fixed displacement expander, and the ratio of the respective displacements of the pump means and the expander means are approximately equal to the ratio of the feed fluid flow to the concentrate fluid flow.

13. The apparatus of claim 12, in which the pump means is a gear pump and the expander means is a gear motor.

14. The apparatus of claim 12, in which the pump means is a vane pump and the expander means is a vane motor.

15. The apparatus of claim 14, wherein said vane pump and vane motor are integrated, and have a common vane rotor carrying a plurality of vanes within an asymmmetric double-lobed housing, said rotor revolving within said housing to define swept volume of said vanes, said housing having a larger lobe and a smaller lobe with respect to the swept volume of said vanes, said larger lobe of the housing serving as the pump means and said smaller lobe of the housing serving as the expander means, so that each vane pumps feed fluid as it sweeps through said larger lobe and expands concentrate fluid as it sweeps through said smaller lobe.

16. The apparatus of claim 1, with means to provide a portion of the total initial feed pressure at the inlet of the pump means as velocity head.

17. A process for separating a feed fluid into permeate and concentrate fractions, comprising the steps of:

(a) providing a free rotor booster pump assembly comprising pump means coupled to expander means, with the pump means and expander means each having an inlet and an outlet, and the expander means being the sole source of mechanically coupled power to the pump means, (b) providing selective membrane means for separating at a working pressure the feed fluid into permeate and concentrate fractions, the membrane means having a feed channel inlet in fluid communication with the pump means outlet and a feed channel outlet in fluid communication with the expander means inlet, (c) admitting to the inlet of the pump means fluid pressurized to an initial feed pressure less than the working pressure, (d) conveying feed fluid from the outlet of the pump means to the feed channel inlet of the membrane means, (e) admitting to the inlet of the expander pressurized concentrate fluid from the feed channel outlet of the membrane means, (f) depressurizing the concentrate fluid by permitting free rotation of the expander means and thereby achieving pressurization of the feed fluid at the pump means outlet to the working pressure by causing simultaneous rotation of the pump means, with the ratio of the initial feed pressure to the working pressure being greater than the ratio of the permeate fluid flow to the feed fluid flow so that the expander means can drive the pump means while overcoming efficiency losses, the process further providing that the ratio of the permeate fluid flow to the feed fluid flow decreases while the working pressure increases, in response to increased resistance of the membrane means to the permeate flow.

18. The process of claim 17, in which the ratio of the permeate fluid flow to the feed fluid flow decreases with increase of working pressure, and increases with decrease of working pressure.

19. The process of claim 18, in which the process is self-regulating under changes in effective membrane permeability, so as to avoid large independent changes in working pressure or the ratio of permeate fluid flow to feed fluid flow.

20. The process of claim 19, in which self-regulation is achieved through torque balance of the free rotor booster pump so as to compensate changes in effective membrane permeability by passively changing the speed of rotation.

21. The process of claim 18, including the steps of:
(a) providing the pump means as a centrifugal pump and the expander means as a radial inflow turbine, and
(b) mechanically coupling the centrifugal pump to the turbine.

22. The process of claim 18, including the steps of:
(a) providing the pump means as a centrifugal pump and the expander means as an impulse turbine, and
(b) mechanically coupling the centrifugal pump to the turbine.

23. The process of claim 22, in which the impulse turbine is a Pelton turbine, and self-regulation against changes in effective membrane permeability is achieved without adjustment of the Pelton turbine nozzle.

24. The process of claim 17, including the step of:
(a) pressurizing the feed fluid to the initial feed pressure with a hydrostatic head prior to admitting the feed fluid to the pump means.

25. The process of claim 17, in which up to approximately half of the total initial feed pressure at the inlet of the pump means is provided as velocity head.

* * * * *